United States Patent
Wang

(10) Patent No.: US 10,649,711 B2
(45) Date of Patent: May 12, 2020

(54) METHOD OF SWITCHING DISPLAY OF A TERMINAL AND A TERMINAL

(71) Applicant: ZTE CORPORATION, Shenzhen, Guangdong Province (CN)

(72) Inventor: Bin Wang, Shenzhen (CN)

(73) Assignee: ZTE CORPORATION (CN)

(*) Notice: Subject to any disclaimer, the term of this patent is extended or adjusted under 35 U.S.C. 154(b) by 111 days.

(21) Appl. No.: 15/557,816

(22) PCT Filed: May 24, 2017

(86) PCT No.: PCT/CN2017/085670
§ 371 (c)(1),
(2) Date: Sep. 13, 2017

(87) PCT Pub. No.: WO2018/126594
PCT Pub. Date: Jul. 12, 2018

(65) Prior Publication Data
US 2018/0293042 A1    Oct. 11, 2018

(30) Foreign Application Priority Data

Jan. 3, 2017 (CN) .......................... 2017 1 0001700

(51) Int. Cl.
*G06F 3/14* (2006.01)
*G09G 5/00* (2006.01)
*G09G 5/395* (2006.01)

(52) U.S. Cl.
CPC .......... *G06F 3/1423* (2013.01); *G09G 5/005* (2013.01); *G09G 5/395* (2013.01);
(Continued)

(58) Field of Classification Search
CPC ....... G09G 5/395; G09G 5/005; G06F 3/1423
See application file for complete search history.

(56) References Cited

U.S. PATENT DOCUMENTS

| 2012/0081304 A1* | 4/2012 | Sirpal .................. G06F 1/1616 345/173 |
| 2015/0153991 A1* | 6/2015 | Liang .................... G06F 3/1431 345/156 |

(Continued)

FOREIGN PATENT DOCUMENTS

| CN | 101515226 | 8/2009 |
| CN | 103076967 | 5/2013 |

(Continued)

OTHER PUBLICATIONS

Patent Cooperation Treaty (PCT), International Search Report and Written Opinion for Application PCT/CN2017/085670 filed May 24, 2017, dated Oct. 12, 2017, International Searching Authority, CN.

(Continued)

*Primary Examiner* — Samantha (Yuehan) Wang
(74) *Attorney, Agent, or Firm* — McDonald Hopkins LLC

(57) ABSTRACT

A method of switching display of a terminal and a terminal are disclosed. The method of switching display includes: obtaining a display mode of the terminal selected by a user, herein the terminal includes a first display screen and a second display screen; determining a display way of an output object on the first display screen and the second display screen according to the display mode selected by the user; and displaying the output object on at least one of the first display screen and the second display screen according to the determined display way.

6 Claims, 7 Drawing Sheets

(52) U.S. Cl.
CPC .............. *G09G 2340/0407* (2013.01); *G09G 2340/0492* (2013.01); *G09G 2354/00* (2013.01); *G09G 2360/04* (2013.01); *G09G 2360/18* (2013.01)

(56) References Cited

U.S. PATENT DOCUMENTS

2016/0189335 A1* 6/2016 Roy ...................... G06F 3/1423
345/545
2019/0042066 A1* 2/2019 Kim ...................... G06F 1/1649

FOREIGN PATENT DOCUMENTS

| CN | 104571337 | 4/2015 |
| CN | 104679467 | 6/2015 |
| CN | 10627795 | 10/2016 |
| JP | 2012212441 | 11/2012 |
| JP | 2013543620 | 12/2013 |

OTHER PUBLICATIONS

Japan Patent Office (JPO), Notification of Reasons for Rejection for Patent Application No. 2017-560936, dated Mar. 22, 2019, Fourth Patent Examination Department, Japan.
Wataru Hashimoto Rules, Windows 10, 2016.

* cited by examiner

METHOD OF SWITCHING DISPLAY OF A TERMINAL AND A TERMINAL

TECHNICAL FIELD

The present disclose relates to the field of communication technologies, e.g., to a method of switching display of a terminal and a terminal.

BACKGROUND

With the continuous development and growing maturity of the communication technologies, applications of software functions in increasingly popular communication devices, such as intelligent display terminals (such as mobile terminals, smart TVs) become more and more abundant and personalized demands of users become higher and higher.

In dual-screen display technologies of terminals, each of contents displayed by two display screens is usually has its own emphasis, the requirements for display effects are different and resolutions of the two display screens are different as well. However, the dual-screen display method does not support simultaneous display of the two screens (i.e., only one of the two screens can be used).

SUMMARY

The present disclosure provides a method of switching display of a terminal and a terminal using the method of switching display, to solve the problem of display coordination and display ways of a first display screen and a second display screen of the terminal in their respective display modes.

An embodiment provides a method of switching display of a terminal, which may include: obtaining a display mode of the terminal selected by a user, herein the terminal includes a first display screen and a second display screen; determining a display way of an output object on the first display screen and the second display screen according to the display mode selected by the user; and displaying the output object on at least one of the first display screen and the second display screen according to the determined display way.

In an implementation mode, the terminal may be a mobile terminal.

In an implementation mode, displaying the output object on at least one of the first display screen and the second display screen according to the determined display way may include: determining the display way to be a first display way according to the display mode selected by the user; determining the output object to be a first displayed content displayed on the first display screen or determining the output object to be a second displayed content displayed on the second display screen according to the first display way; and displaying the first displayed content on the first display screen and controlling the second display screen to be in a non-working state or displaying the second displayed content on the second display screen and controlling the first display screen to be in the non-working state.

In an implementation mode, determining the output object to be the first displayed content displayed on the first display screen or determining the output object to be the second displayed content displayed on the second display screen according to the first display way may include: adjusting a resolution of the output object according to a screen resolution of the first display screen to obtain the first displayed content or adjusting the resolution of the output object according to a screen resolution of the second display screen to obtain the second displayed content; filling the first displayed content or the second displayed content into a display buffer Framebuffer; and refreshing the content in the display buffer Framebuffer to a display driver of the first display screen or the second display screen.

In an implementation mode, displaying the output object on at least one of the first display screen and the second display screen according to the determined display way may include: determining the display way to be a second display way according to the display mode selected by the user; determining a first portion of the output object to be a third displayed content displayed on the first display screen and a second portion of the output object to be a fourth displayed content displayed on the second display screen according to the second display way; and displaying the third displayed content and the fourth displayed content on the first display screen and the second display screen respectively.

In an implementation mode, determining the first portion of the output object to be the third displayed content displayed on the first display screen and the second portion of the output object to be the fourth displayed content displayed on the second display screen according to the second display way may include: adjusting resolutions of the first portion and the second portion of the output object according to the screen resolutions of the first display screen and the second display screen respectively to obtain the third displayed content and the fourth displayed content; filling the third displayed content and the fourth displayed content into the display buffer Framebuffer; and refreshing the contents in the display buffer Framebuffer to the display drivers of the first display screen and the second display screen.

In an implementation mode, displaying the output object on at least one of the first display screen and the second display screen according to the determined display way may include: determining the display way to be a third display way according to the display mode selected by the user; determining the output object to be a fifth displayed content displayed on the first display screen or determining the output object to be a sixth displayed content displayed on the second display screen according to the third display way, herein there is a mirroring relationship between the fifth displayed content and the sixth displayed content; and displaying the fifth displayed content and the sixth displayed content on the first display screen and the second display screen respectively.

In an implementation mode, determining the output object to be the fifth displayed content displayed on the first display screen or determining the output object to be the sixth displayed content displayed on the second display screen according to the third display way, herein there is the mirroring relationship between the fifth displayed content and the sixth displayed content, includes: adjusting the resolution of the output object according to the screen resolution of the first display screen to obtain the fifth displayed content; processing the fifth content in a mirroring manner to obtain the sixth content, herein the sixth content is displayed on the second display screen; filling the fifth displayed content and the sixth displayed content into the display buffer Framebuffer; and refreshing the content in the display buffer Framebuffer to the display drivers of the first display screen and the second display screen.

An embodiment further provides a terminal, which may include: an obtaining module, a processing module and a control module.

The obtaining module is configured to obtain a display mode of the terminal selected by a user, herein the terminal includes a first display screen and a second display screen.

The processing module is configured to determine a display way of an output object on the first display screen and the second display screen according to the display mode selected by the user obtained by the obtaining module.

The control module is configured to display the output object on at least one of the first display screen and the second display screen according to the display way determined by the processing module.

In an implementation mode, the control module may include a first control unit, a second unit and a third control unit.

The first control unit is configured to determine the display way to be a first display way according to the display mode selected by the user.

The second control unit is configured to determine the output object to be a first displayed content displayed on the first display screen or determine the output object to be a second displayed content displayed on the second display screen according to the first display way.

The third control unit is configured to display the first displayed content on the first display screen and control the second display screen to be in a non-working state or display the second displayed content on the second display screen and control the first display screen to be in the non-working state.

In an implementation mode, the second control unit may include a first output subunit, a first filling subunit and a first buffer subunit.

The first output subunit is configured to adjust a resolution of the output object according to a screen resolution of the first display screen to obtain the first displayed content, or adjust the resolution of the output object according to a screen resolution of the second display screen to obtain the second displayed content.

The first filling subunit is configured to fill the first displayed content or the second displayed content into a display buffer Framebuffer.

The first buffer subunit is configured to refresh the content in the display buffer Framebuffer to a display driver of the first display screen or the second display screen.

In an implementation mode, the control module may include a fourth control unit, a fifth control unit and a sixth control unit.

The fourth control unit is configured to determine the display way to be a second display way according to the display mode selected by the user.

The fifth control unit is configured to determine a first portion of the output object to be a third displayed content displayed on the first display screen and a second portion of the output object to be a fourth displayed content displayed on the second display screen according to the second display way.

The sixth control unit is configured to display the third displayed content and the fourth displayed content on the first display screen and the second display screen respectively.

In an implementation mode, the fifth control unit may include a second output subunit, a second filling subunit and a second butter subunit.

The second output subunit is configured to adjust resolutions of the first portion and the second portion of the output object according to the screen resolutions of the first display screen and the second display screen respectively to obtain the third displayed content and the fourth displayed content.

The second filling subunit is configured to fill the third displayed content and the fourth displayed content into the display buffer Framebuffer.

The second buffer subunit is configured to refresh the contents in the display buffer Framebuffer to the display drivers of the first display screen and the second display screen.

In an implementation mode, the control module may include a seventh control unit, an eighth control unit and a ninth control unit.

The seventh control unit is configured to determine the display way to be a third display way according to the display mode selected by the user.

The eighth control unit is configured to determine the output object to be a fifth displayed content displayed on the first display screen and a sixth displayed content displayed on the second display screen according to the third display way, herein there is a mirroring relationship between the fifth displayed content and the sixth displayed content.

The ninth control unit is configured to display the fifth displayed content on the first display screen and display the sixth displayed content on the second display screen.

In an implementation mode, the eighth control unit includes a third output subunit, a transformation subunit, a third filling subunit and a third buffer subunit.

The third output subunit is configured to adjust the resolution of the output object according to the screen resolution of the first display screen to obtain the fifth displayed content.

The transformation subunit is configured to process the fifth content in a mirroring manner to obtain the sixth content, herein the sixth content is displayed on the second display screen.

The third filling subunit is configured to fill the fifth displayed content and the sixth displayed content into the display buffer Framebuffer.

The third buffer subunit is configured to refresh the contents in the display buffer Framebuffer to the display drivers of the first display screen and the second display screen.

The embodiment further provides a computer readable storage medium having computer executable instructions stored therein used to execute the method described above.

The embodiment further provides an electronic device including one or more processors, a storage and one or more programs stored in the storage, which, when executed by the one or more processors, execute the method described above.

The embodiment further provides a computer program product including computer programs stored in a computer readable storage medium, the computer programs include program instructions, which, when executed by a computer, cause the computer to execute the method described above.

With the method of switching display of the terminal and the terminal provided by the embodiment, by obtaining the display mode of the terminal selected by the user, the display way of the output object on the first display screen and the second display screen is determined, and the output object is displayed on at least one of the first display screen and the second display screen according to the display way, thus the problem of display coordination and display ways of the first display screen and the second display screen of the terminal in multiple display modes can be solved.

BRIEF DESCRIPTION OF DRAWINGS

In order to illustrate the scheme of an embodiment more clearly, the companying drawings needed for describing the embodiment will be introduced briefly below.

DETAILED DESCRIPTION

The technique scheme of the embodiment will be described clearly and completely below in conjunction with the accompanying drawings in the embodiment. The embodiments described are a portion of embodiments of the present disclosure, but not all of the embodiments. The following embodiments and schemes in the embodiments can be combined with each other without conflict.

The First Embodiment

Figure 1:
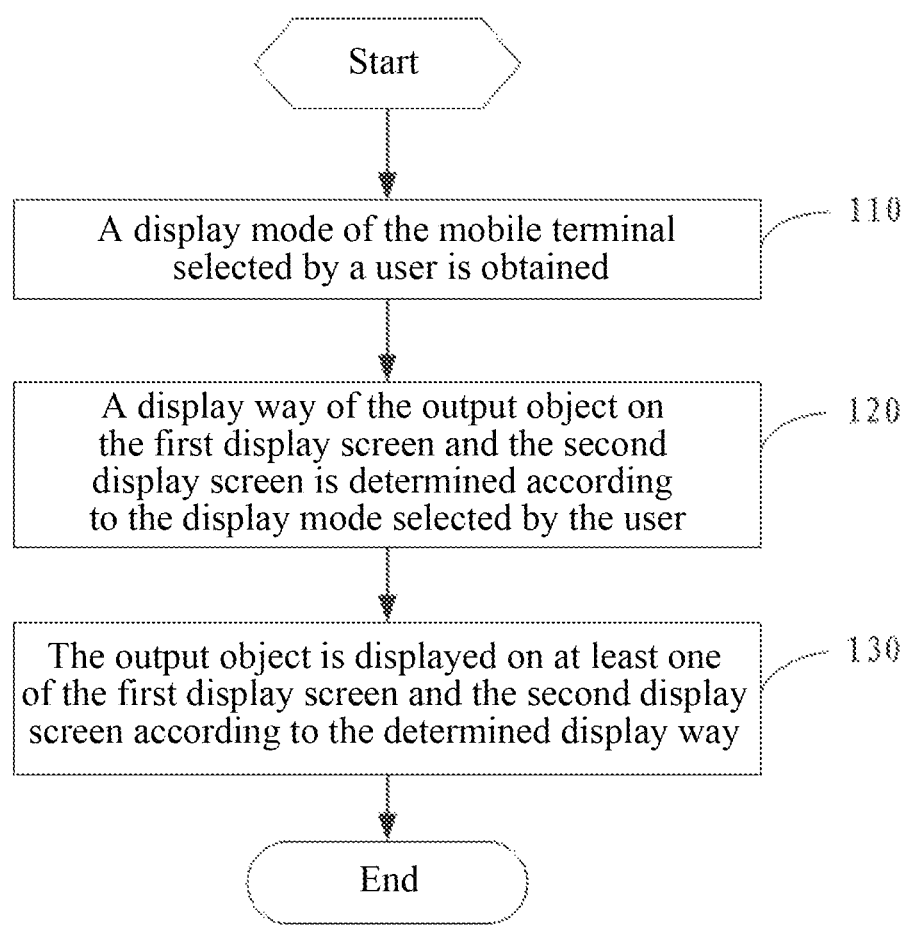
FIG. 1 is a flow chart of a method of switching display of a mobile terminal in accordance with an embodiment.

Referring to FIG. 1, it is a flow chart of a method of switching display of a terminal in accordance with the embodiment. The method may be applied in a terminal using an Android system, which may be an intelligent terminal, a mobile terminal or an intelligent mobile terminal. The following embodiment will be described by taking the terminal, which is a mobile terminal, as an example, but those skilled in the art should understand that this is not a limitation to the type of the terminal. As shown in FIG. 1, the method may include the following steps.

In step 110, a display mode of the mobile terminal selected by a user is obtained.

The mobile terminal may include a first display screen and a second display screen, and the display mode may be understood as a mode in which an output object is displayed on the first display screen and the second display screen of the mobile terminal. There may be various display modes of the mobile terminal, such as a first display mode, a second display mode and a third display mode. The first display mode may be a single-screen mode, the second display mode may be a large-screen mode, and the third display mode may be a mirroring mode.

The single-screen mode refers to a display mode in which one of the first display screen and the second display screen of the mobile terminal is chosen to display the output object, and the other display screen is in a standby or sleep state. The large-screen mode refers to a display mode in which the first display screen is combined with the second display screen of the mobile terminal to display one output object. The mirroring mode refers to a display mode in which one of the first display screen and the second display screen of the mobile terminal is chosen to display the output object, and the other display screen displays an output object transformed from the output object in a mirroring manner.

In step 120, a display way used by the first display screen and the second display screen for displaying the output object is determined according to the display mode selected by the user.

The display way is changed accordingly based on the different display modes selected by the user, and includes a first display way, a second display way and a third display way. That is, different display modes correspond to different display ways. In the embodiment, each of the display modes corresponds to one display way of the display screen.

In an implementation mode, the mobile terminal may include a processor, which may display multiple display modes corresponding to the display screens on the first display screen or the second display screen to present them to the user. The user selects a display mode as needed. The processor determines, according to the display mode selected by the use, a display way corresponding to the selected display mode.

If the user selects the single-screen mode, then it is determined that the display way of the first display screen and the second display screen is to display a first displayed content of the output object on the first display screen and control the second display screen to be in a non-working state, or to display a second displayed content of the output object on the second display screen and control the first display screen to be in the non-working state.

If the user selects the large-screen mode, then it is determined that the display way of the first display screen and the second display screen is to display a portion of the output object as a third displayed content on the first display screen and display another portion of the output object as a fourth displayed content on the second display screen.

In an implementation mode, the output object is divided into a first portion and second portion. In the large-screen mode, it is determined that the first portion of the output object is displayed on the first display screen as the third displayed content, and the second portion of the output object is displayed on the second display screen as the fourth displayed content.

If the user selects the mirroring mode, then it is determined that the display way of the first display screen and the second display screen is to display a fifth displayed content of the output object on the first display screen and display a sixth displayed content obtained by mirroring the fifth displayed content on the second display screen.

In step 130, the output object is displayed on the first display screen and/or the second display screen according to the determined display way of the first display screen and the second display screen.

The output object may be a video, a picture, text, etc.

The architecture of the Android mobile terminal cannot support the three display modes, and the mobile terminal needs to be reinitialized to support them.

The displayed content of the Android system may be provided through a display buffer Framebuffer. Generally, one display screen corresponds to one Framebuffer. If dual-screen display is implemented, two Framebuffers may be used or two display screens use one Framebuffer. The Android framework is responsible for preparing the displayed contents, which are synthesized to obtain the final displayed content through the Framebuffer finally. The mobile terminal uses two Framebuffers, and the displayed contents of the Android system need an independent layout on the two Framebuffers independently and separately drawing. For general-purpose applications using the Android system, the layout should be carried out based on a dots per inch (DPI) display resolution. After the resolution is determined, the system will lay out a display interface based on the resolution. The larger the resolution, the higher the capacity of the Framebuffer.

A corresponding relationship between the display modes and resolutions may include the single-screen mode, the large-screen mode, and the mirroring mode. In the single-screen mode, the system is set at a resolution of one display screen, only the content of one display screen is updated and the other display screen is in a sleep or power-off state to save power. In the large-screen mode, physical resolutions of the two display screens superimpose and the system completes the drawing according to a normal drawing procedure. In the mirroring mode, the system is set at a resolution of one display screen, and for the displayed content of the other display screen, coordinate transformation and symmetric transformation are performed on the content displayed on the current display screen.

In the embodiment, after the mobile terminal is power on, the two display screens are mapped to one Framebuffer, and a visual area of a window is adjusted by adjusting the display resolution to complete switching of various display modes. Switching dynamically the screen resolutions can achieve the switching of multiple display modes.

In the embodiment, the terminal can carry out the switching of various display modes through a window manager (WM) command coming with the Android system. The WM command can adjust the resolution of the terminal using the Android system. The WM command can decrease the high display resolution of the terminal such that a display window of the terminal is switched from a high resolution state to a low resolution state. When the display window of the terminal is in the high resolution state, the displayed image is centered to be displayed in the display window of the terminal, and black or other background color is displayed in areas of the window which are not covered by the image. When window is switched from the high resolution state to the low resolution state, the WM command changes the resolution of the window of the terminal, thus the display way of the image may be changed. In the low resolution state, for example, the image is displayed at the top left corner of the display window of the terminal. After the screen is rotated, the problem of coordinate transformation exists, and a corresponding relationship of the coordinate transformation needs to be modified and adjusted according to the rotation direction. In the embodiment, in the switching and display process of the mobile terminal, after the display modes of the mobile terminal and the display ways of the first display screen and the second display screen of the mobile terminal are determined, the output object of the mobile terminal is displayed on the first display screen and/or the second display screen, and the switching and display process of the mobile terminal is completed.

In the embodiment, by obtaining the display mode of the terminal selected by the user, the display ways used by the first display screen and the second display screen for displaying the output object are determined, and the output object is displayed on the first display screen and/or the second display screen, thus the problem of display coordination and display ways of the first display screen and the second display screen of the terminal in different display modes is solved.

The Second Embodiment

Figure 2:
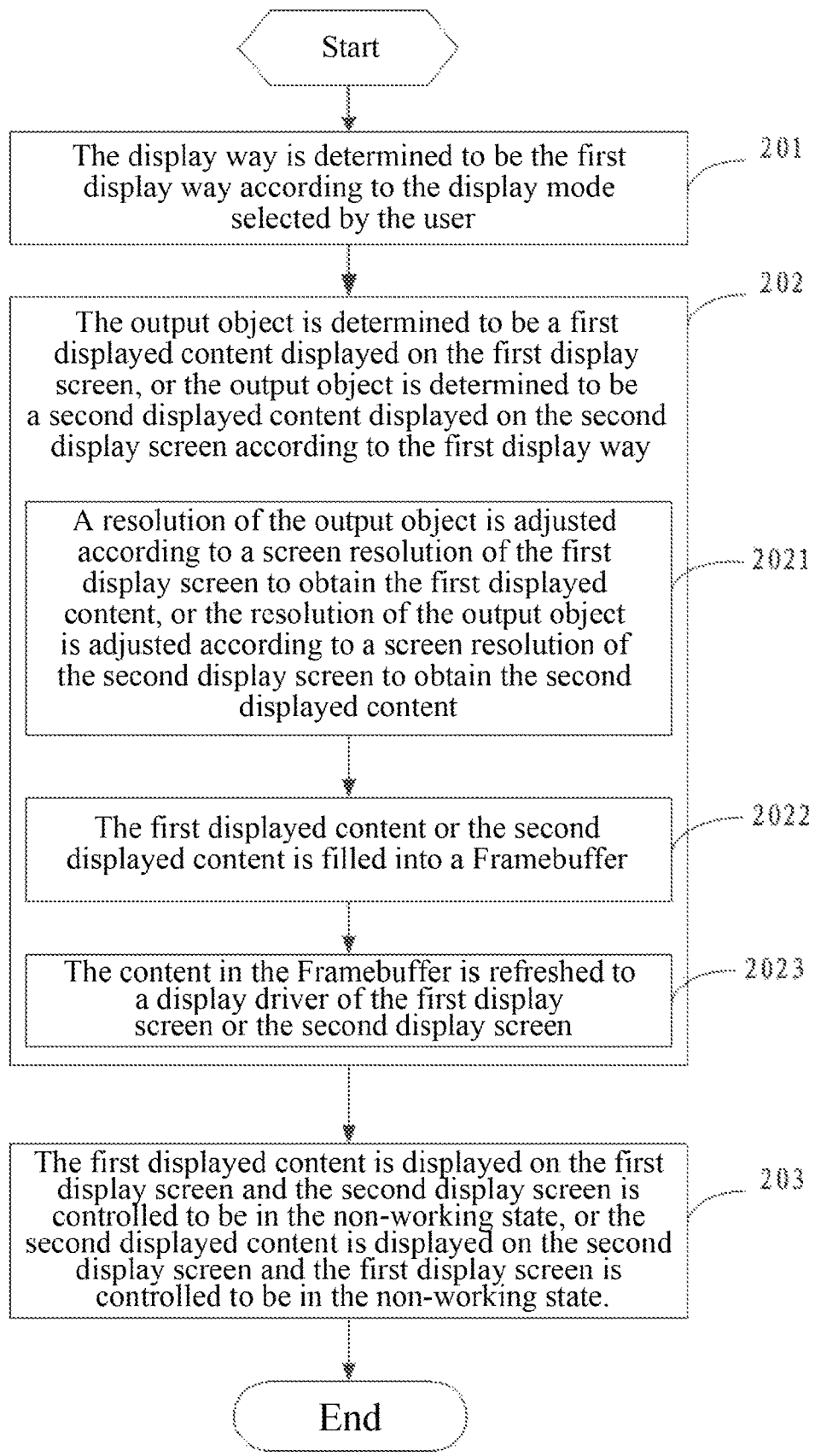
FIG. 2 is a flow chart of a first display way of the method of switching display of the mobile terminal in accordance with an embodiment.

On the basis of the first embodiment described above, referring to FIG. 2, it is a flow chart of the first display way of the method of switching display of the mobile terminal in accordance with the embodiment. As shown in FIG. 2, the method may include the following steps.

In step 201, the display way of the first display screen and the second display screen is determined to be the first display way according to the display mode selected by the user.

In the embodiment, the mobile terminal may include the first display screen and the second display screen. The display way of the first display screen and the second display screen is the first display way, i.e., the single-screen display mode. In the display mode, one of the first display screen and the second display screen is chosen to display the output content of the mobile terminal, and the other display screen is in a non-working state.

In step 202, the output object is determined to be a first displayed content displayed on the first display screen or the output object is determined to be a second displayed content displayed on the second display screen according to the first display way.

In step 203, the first displayed content is displayed on the first display screen and the second display screen is controlled to be in the non-working state, or the second displayed content is displayed on the second display screen and the first display screen is controlled to be in the non-working state.

Step 202 may include the following steps.

In step 2021, a resolution of the output object is adjusted according to a screen resolution of the first display screen to obtain the first displayed content, or the resolution of the output object is adjusted according to a screen resolution of the second display screen to obtain the second displayed content.

In step 2022, the first displayed content or the second displayed content is filled into a Framebuffer.

In step 2023, the content in the Framebuffer is refreshed to a display driver of the first display screen or the second display screen.

Figure 6:
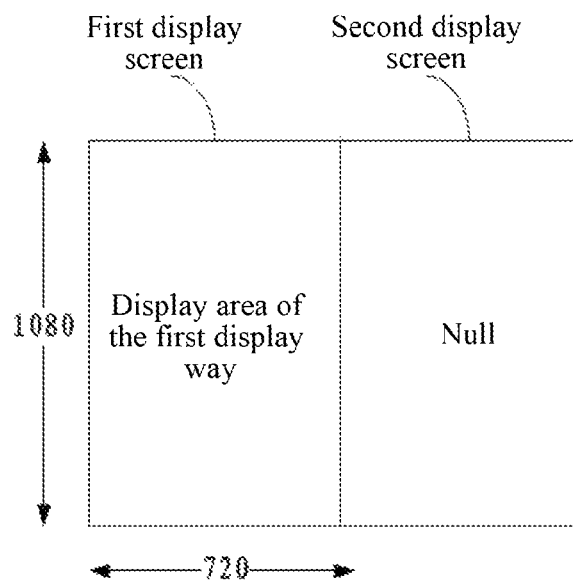
FIG. 6 is a schematic diagram of a first display way of the mobile terminal with the dual-screen switching display mode in accordance with an embodiment.

As shown in FIG. 6, a schematic diagram of the first display way of the mobile terminal with a dual-screen switching display mode in accordance with the embodiment is provided.

In FIG. 6, taking a display screen with a single-screen physical resolution being 720×1080 as an example, in the embodiment, the mobile terminal is in the first display way, any one of the first display screen and the second display screen is in the working state and the other is in the non-working state. For example, in FIG. 6, in the first display way, the first display screen is in the working state, and the second display screen is in the non-working state.

The mobile terminal is power on, and driver loading of the first display screen and the second display screen and mapping of the Framebuffer are completed. Here, the size of the Framebuffer is superimposition of physical resolutions of the first display screen and the second display screen, i.e., 1080×720×2. Java layer services of the Android system of the mobile terminal are started, and after the WM command is activated, display of the mobile terminal using the Android system may be controlled by a window manager, and the switching of the display modes may be carried out according to operation and setting of the user.

In an implementation mode, the Framebuffer corresponds to an area in memory of the mobile terminal. Data for displaying images is stored in the area.

The screen resolution of the display screen of the mobile terminal may refer to the number of vertically and horizontally upward pixel dots, the unit of which is px, 1 px representing 1 pixel dot, and is represented by vertical pixels×horizontal pixels. The pixel density of the display screen may refer to the number of dots per inch, the unit of which is dpi. The pixel density of the display screen is related to the size of the screen and the screen resolution. Under a single change condition, for example, in the case of the constant pixel density of the display screen, the smaller the size of the display screen, the higher the resolution of the display screen. In the case of the constant size of the display screen, the larger the pixel density of the display screen, the lower the resolution of the display screen.

The mobile terminal calculates the number of dots per inch (dpi) based on screen resolutions of different display screens. Taking the Android system as an example, layout of a display system of the Android is carried out according to the set resolution. The setting of the resolution is completed, and for different applications, the size of a display area of the mobile terminal changes. For example, when a video is being played and a visual area of the video is changed (shrunken or enlarged), the display system will redistribute and display the range required to be output and drawn according to the size of a new visual area, and render the range and complete processing.

For the first display way, i.e., in the single-screen mode, the WM command sets the display resolution to be 1080×720. Only one of the first display screen and the second display screen works, the other display screen is in the non-working state of low power consumption or power failure, and the Framebuffer corresponding to the display screen in the non-working state is not refreshed.

In an implementation mode, the display modes of the first display screen and the second display screen can be controlled respectively by the same processor.

In an implementation mode, the other display screen may be in the non-working state of low power consumption. The low power consumption refers to that some components in the mobile terminal do not work. For example, only a processor in the mobile terminal in the low power consumption is in the working state, and other components are in the standby state. When a work instruction of the processor is received, the components are switched from the standby state to the normal working state.

In an implementation mode, the other display screen may further be in the non-working state of power down. The power down refers to that all the components in the mobile terminal are in the power-off state.

The Third Embodiment

Figure 3:
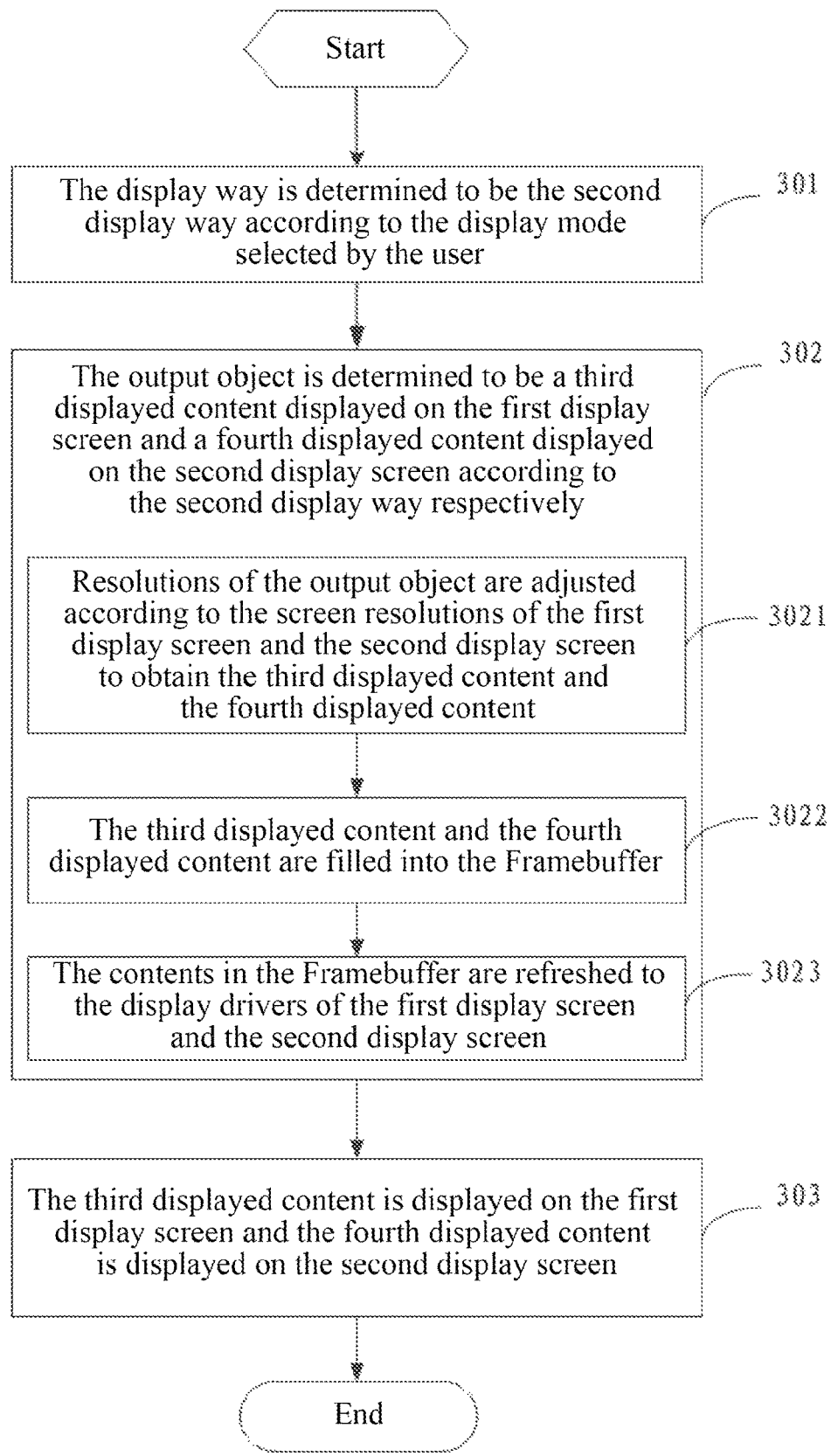
FIG. 3 is a flow chart of a second display way of the method of switching display of the mobile terminal in accordance with an embodiment.

On the basis of the first embodiment described above, referring to FIG. 3, it is a flow chart of the second display way of the method of switching display of the mobile terminal in accordance with the embodiment. As shown in FIG. 3, the method may include the following steps.

In step 301, the display way of the first display screen and the second display screen is determined to be the second display way according to the display mode selected by the user.

In the embodiment, the mobile terminal includes the first display screen and the second display screen. The display way of the first display screen and the second display screen is the second display way, i.e., the large-screen display mode. In the display mode, the first display screen is combined with the second display screen of the mobile terminal to display one output object.

In step 302, the output object is determined to be a third displayed content displayed on the first display screen and a fourth displayed content displayed on the second display screen according to the second display way respectively.

In step 303, the third displayed content is displayed on the first display screen and the fourth displayed content is displayed on the second display screen.

Step 302 may include the follow steps.

In Step 3021, resolutions of the output object are adjusted according to the screen resolutions of the first display screen and the second display screen to obtain the third displayed content and the fourth displayed content.

In step 3022, the third displayed content and the fourth displayed content are filled into the Framebuffer.

In step 3023, the contents in the Framebuffer are refreshed to the display drivers of the first display screen and the second display screen.

Figure 7:
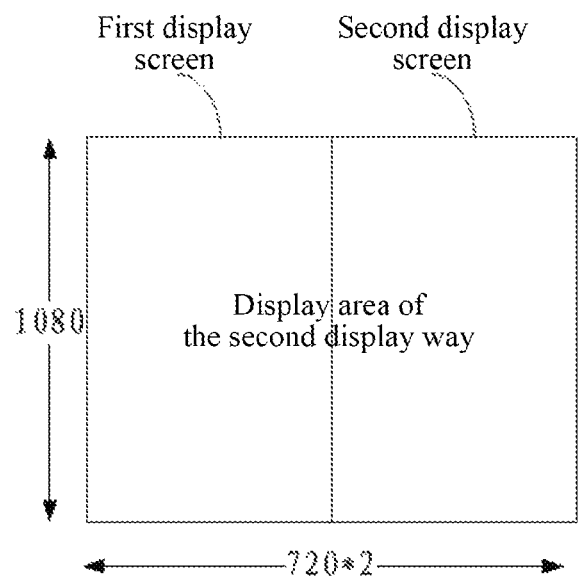
FIG. 7 is a schematic diagram of a second display way of the mobile terminal with the dual-screen switching display mode in accordance with an embodiment.

As shown in FIG. 7, a schematic diagram of the second display way of the mobile terminal with a dual-screen switching display mode in accordance with the embodiment is provided.

In FIG. 7, taking a display screen with a single-screen physical resolution being 720×1080 as an example, in the embodiment, the display mode in which the first display screen of the mobile terminal in the first display way is combine with the second display screen to display one output object is described.

The mobile terminal is power on, and driver loading of the first display screen and the second display screen and mapping of the Framebuffer are completed. Here, the size of the Framebuffer is superimposition of two physical resolutions, i.e., 1080×720×2.

For the second display way, i.e., in the large-screen mode, the WM command of the mobile terminal sets the display resolution to be 1080*720*2. The system adjusts display and layout of the first display screen and the second display screen according to the set resolution, and the application selects appropriate interface layout to complete switching of the large-screen mode according to the newly set resolution.

The Fourth Embodiment

Figure 4:
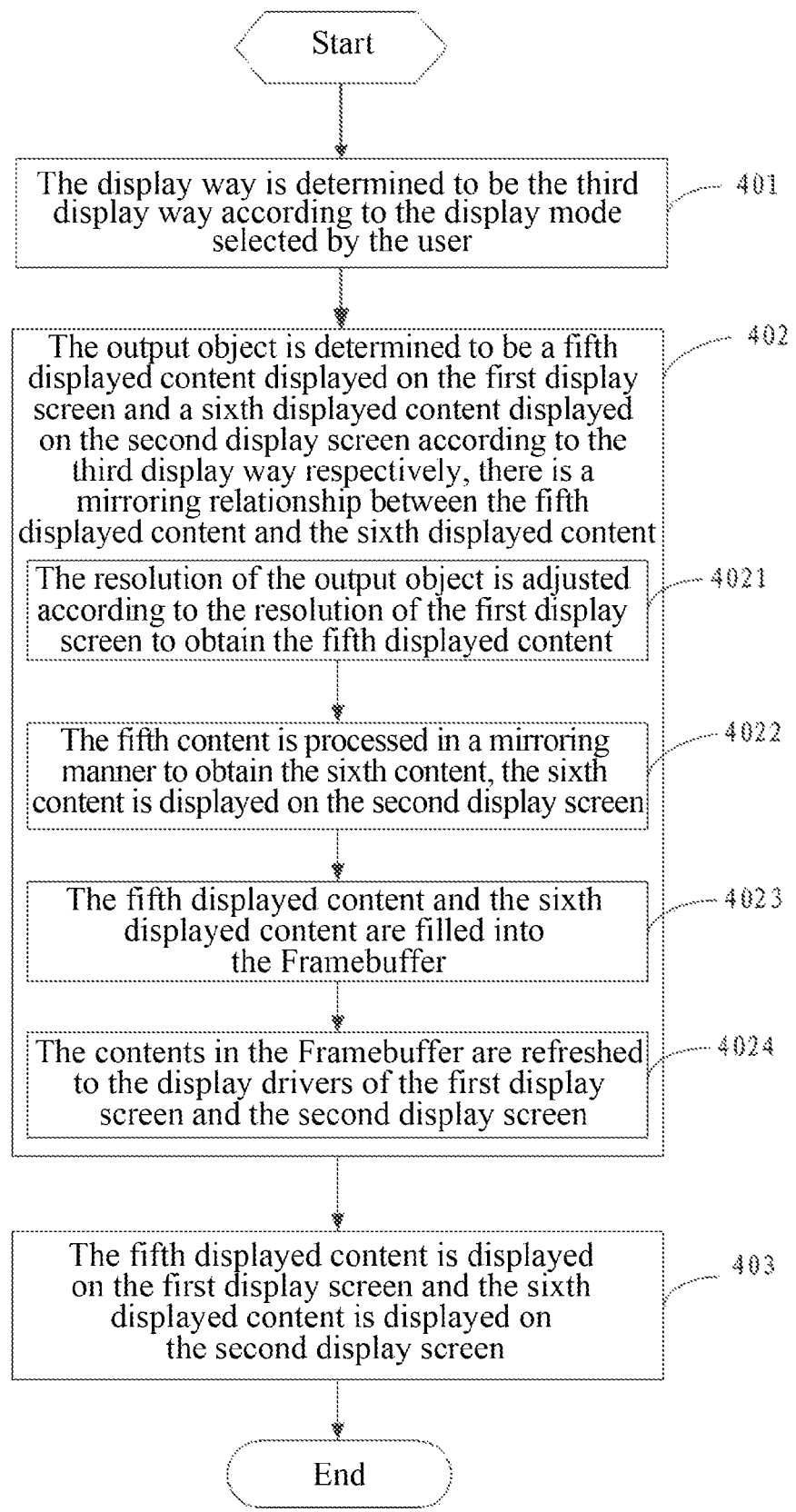
FIG. 4 is a flow chart of a third display way of the method of switching display of the mobile terminal in accordance with an embodiment.

On the basis of the first embodiment described above, referring to FIG. 4, it is a flow chart of the third display way of the method of switching display of the mobile terminal in accordance with the embodiment. As shown in FIG. 4, the method may include the following steps.

In step 401, the display way of the first display screen and the second display screen is determined to be the third display way according to the display mode selected by the user.

The mobile terminal includes the first display screen and the second display screen. The display way of the first display screen and the second display screen is the third display way, i.e., the mirroring display mode. In the display mode, one of the first display screen and the second display screen of the mobile terminal is chosen to display the output object, and the other display screen displays an output object transformed from the output object in a mirroring manner.

In step 402, the output object is determined to be a fifth displayed content displayed on the first display screen and a sixth displayed content displayed on the second display screen according to the third display way respectively, there is a mirroring relationship between the fifth displayed content and the sixth displayed content.

In step 403, the fifth displayed content is displayed on the first display screen and the sixth displayed content is displayed on the second display screen.

Step 402 may include the follow steps.

In step 4021, the resolution of the output object is adjusted according to the resolution of the first display screen to obtain the fifth displayed content.

In step 4022, the fifth content is processed in a mirroring manner to obtain the sixth content, the sixth content is displayed on the second display screen.

In step 4023, the fifth displayed content and the sixth displayed content are filled into the Framebuffer.

In step 4024, the contents in the Framebuffer are refreshed to the display drivers of the first display screen and the second display screen.

Figure 8:
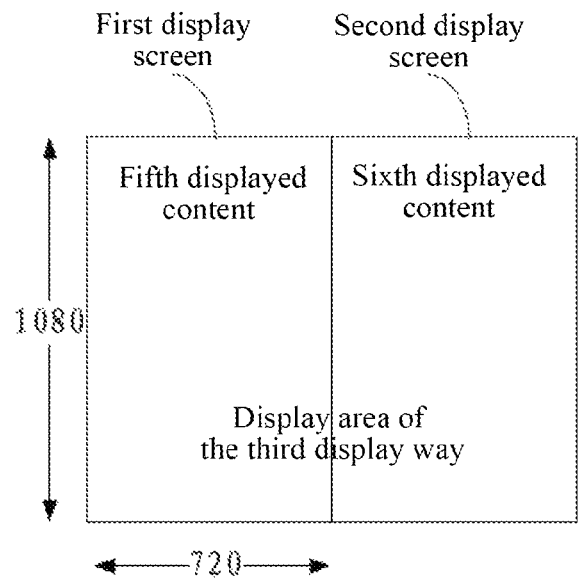
FIG. 8 is a schematic diagram of a third display way of the mobile terminal with the dual-screen switching display mode in accordance with an embodiment.

As shown in FIG. 8, a schematic diagram of the third display way of the mobile terminal with a dual-screen switching display mode in accordance with the embodiment is provided.

In FIG. 8, taking a display screen with a single-screen physical resolution being 720×1080 as an example, in the embodiment, in the third display way, it is a display mode in which one of the first display screen and the second display screen of the mobile terminal in the third display way is chosen to display the output object, and the other display screen displays an output object transformed from the output object in a mirroring manner.

For the third display way, i.e., in the mirroring mode, the WM command of the mobile terminal sets the display resolution to be 1080×720, one of the first display screen and the second display screen of the mobile terminal is chosen to display the output object, and the other display screen displays an output object transformed from the output object in a mirroring manner. The displayed contents are filled into the Framebuffer, and the contents in the Framebuffer are refreshed to the display drivers of the first display screen and the second display screen.

The Fifth Embodiment

Figure 5:
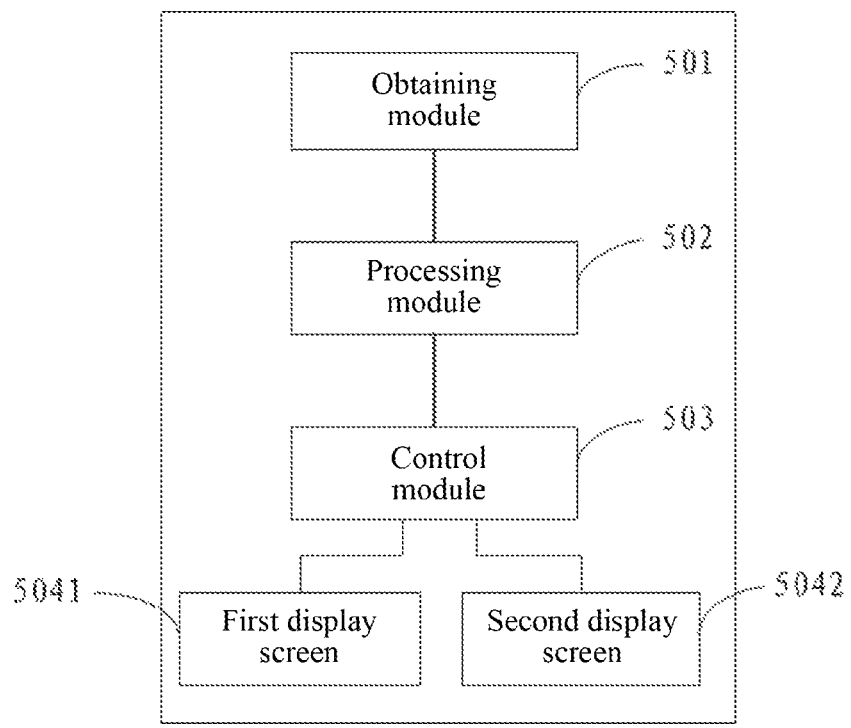
FIG. 5 is a block diagram of a mobile terminal with a dual-screen switching display mode in accordance with an embodiment.

Referring to FIG. 5, it is a block diagram of a mobile terminal with a dual-screen switching display mode in accordance with the embodiment. As shown in FIG. 5, the terminal may include an obtaining module 501, a processing module 502 and a control module 503.

The obtaining module 501 is configured to obtain a display mode of the terminal selected by a user.

The processing module 502 is configured to determine a display way used by the first display screen 5041 and the second display screen 5042 for displaying an output object according to the display mode selected by the user obtained by the obtaining module 501.

The control module 503 is configured to display the output object on the first display screen 5041 and/or the second display screen 5042 according to the display way of the first display screen 5041 and the second display screen 5042 determined by the processing module 502.

The obtaining module 501 obtains the display modes of the mobile terminal. The obtaining module 501 may be designed to be three buttons for operation. The processing module 502 determines the display way used by the first display screen 5041 and the second display screen 5042 for displaying the output object according to the display mode selected by the user obtained by the obtaining module 501. The control module 503 displays the output object on the first display screen 5041 and/or the second display screen 5042 according to the display way of the first display screen 5041 and the second display screen 5042 determined by the processing module 502.

In an implementation mode, the control module 502 may include a first control unit, a second unit and a third control unit.

The first control unit is configured to determine the display way to be a first display way according to the display mode selected by the user.

The second control unit is configured to determine the output object to be a first displayed content displayed on the first display screen, or determine the output object to be a second displayed content displayed on the second display screen according to the first display way.

The third control unit is configured to display the first displayed content on the first display screen and control the second display screen to be in a non-working state, or display the second displayed content on the second display screen and control the first display screen to be in the non-working state.

In an implementation mode, the second control unit may include a first output subunit, a first filling subunit and a first buffer subunit.

The first output subunit is configured to adjust a resolution of the output object according to a screen resolution of the first display screen to obtain the first displayed content or adjust the resolution of the output object according to a screen resolution of the second display screen to obtain the second displayed content.

The first filling subunit is configured to fill the first displayed content or the second displayed content into a Framebuffer.

The first buffer subunit is configured to refresh the content in the Framebuffer to a display driver of the first display screen or the second display screen.

In an implementation mode, the control module may include a fourth control unit, a fifth control unit and a sixth control unit.

The fourth control unit is configured to determine the display way to be a second display way according to the display mode selected by the user.

The fifth control unit is configured to determine a first portion of the output object to be a third displayed content displayed on the first display screen and a second portion of the output object to be a fourth displayed content displayed on the second display screen according to the second display way.

The sixth control unit is configured to display the third displayed content and the fourth displayed content on the first display screen and the second display screen respectively.

In an implementation mode, the fifth control unit includes a second output subunit, a second filling subunit and a second butter subunit.

The second output subunit is configured to adjust resolutions of the first portion and the second portion of the output object according to the screen resolutions of the first display screen and the second display screen respectively to obtain the third displayed content and the fourth displayed content.

The second filling subunit is configured to fill the third displayed content and the fourth displayed content into the Framebuffer.

The second buffer subunit is configured to refresh the content in the Framebuffer to the display drivers of the first display screen and the second display screen.

In an implementation mode, the control module may include a seventh control unit, an eighth control unit and a ninth control unit.

The seventh control unit is configured to determine the display way to be a third display way according to the display mode selected by the user.

The eighth control unit is configured to determine the output object to be a fifth displayed content displayed on the first display screen and a sixth displayed content displayed on the second display screen according to the third display way, there is a mirroring relationship between the fifth displayed content and the sixth displayed content.

The ninth control unit is configured to display the fifth displayed content on the first display screen and display the sixth displayed content on the second display screen.

In an implementation mode, the eighth control unit includes a third output subunit, a transformation subunit, a third filling subunit and a third buffer subunit.

The third output subunit is configured to adjust the resolution of the output object according to the screen resolution of the first display screen to obtain the fifth displayed content.

The transformation subunit is configured to process the fifth content in a mirroring manner to obtain the sixth content, the sixth content is displayed on the second display screen.

The third filling subunit is configured to fill the fifth displayed content and the sixth displayed content into the Framebuffer.

The third buffer subunit is configured to refresh the content in the Framebuffer to the display drivers of the first display screen and the second display screen.

The Sixth Embodiment

The embodiment further provides a computer readable storage medium having computer executable instructions stored therein used to execute the method described above.

The Seventh Embodiment

Figure 9:
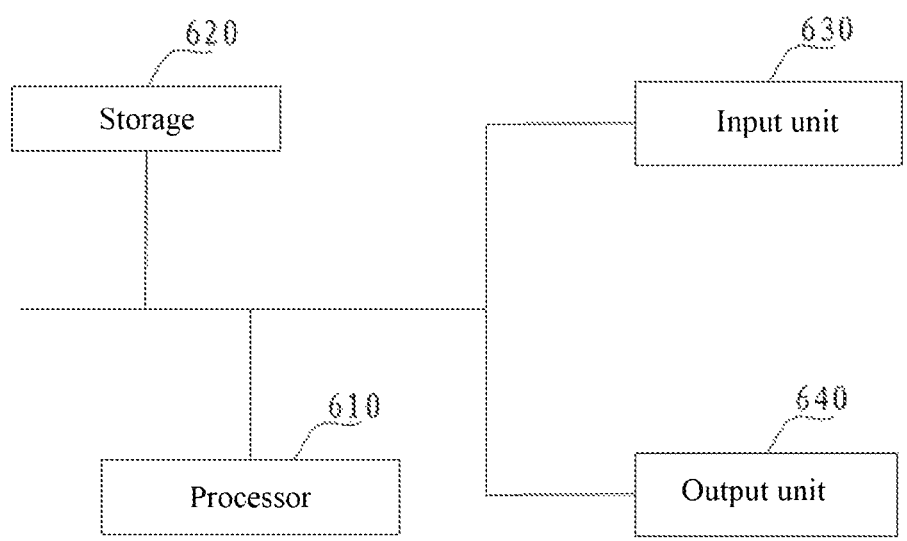
FIG. 9 is a structure schematic diagram of general-purpose hardware of an electronic device in accordance with the embodiment.

Referring to FIG. 9, which is a structure schematic diagram of general-purpose hardware of an electronic device in accordance with the embodiment. As shown in FIG. 9, the electronic device includes one or more processors 610 and a storage 620. One processor 610 is described in FIG. 9 as an example.

The electronic device may further include an input unit 630 and an output unit 640.

The processors 610, the storage 620, the input unit 630 and the output unit 640 in the electronic device may be connected via buses or in other ways. The connection via buses is described in FIG. 9 as an example.

The input unit 630 may receive input number or character information, and the output unit 640 may include a display device, such as a display screen.

The storage 620, used as a computer readable storage medium, may be used to store software programs, computer executable programs and modules. The processor 610 performs various function applications and data processing by running the software programs, instructions and modules stored in the storage 620, to implement any one of the methods described in the above embodiments.

The storage 620 may include a storage program area and a storage data area. The storage program area may store operating systems and application programs needed by at least one function. The storage data area may store data created according to the usage of the electronic device. In addition, the memory may include volatile memory, such as random access memory (RAM), and may also include non-volatile memory, such as at least one disk storage device, flash memory device or other non-transient solid state memory device.

The storage 620 may be a non-transient computer storage medium or transient computer storage medium. The non-transient computer storage medium includes, for example, at least one disk storage device, flash memory device or other non-transient solid state memory device. In some embodiments, the storage 620 may include storages set remotely relative to the processor 610. The remote storages may be connected to the electronic device via network connections. Examples of the above network may include Internet, Intranet, local area network, mobile communication network and a combination thereof.

The input unit 630 may be used for receiving the input number or character information and generating a key signal input associated with user settings and function control of the electronic device. The output unit 640 may include a display device, such as a display screen.

Finally, it should be noted that people having ordinary skill in the art may understand that all or part of procedures in the method embodiments described above can be carried out by the related hardware through computer programs. The computer programs can be stored in a non-transient computer readable storage medium, and, when executed, can include the procedures of the method embodiments. The computer readable storage medium may be a magnetic disk, an optic disk, only read memory (ROM) or random access memory (RAM).

INDUSTRIAL APPLICABILITY

The present disclosure provides a method of switching display of a terminal to implement display switching of dual-screen display of a terminal, to solve the problem of display coordination and display ways of a first display screen and a second display screen of the terminal in various display modes.

What is claimed is:

1. A method of switching display of a terminal comprising:
   obtaining a display mode of the terminal selected by a user, wherein the terminal comprises a first display screen and a second display screen;
   determining a display way of an output object on the first display screen and the second display screen according to the display mode selected by the user; and
   displaying the output object on at least one of the first display screen and the second display screen according to the determined display way,
   wherein the terminal is a mobile terminal, and the displaying the output object on at least one of the first display screen and the second display screen according to the determined display way comprises:
in the instance where the determined display way is a mirroring display mode:
determining the output object to be a first displayed content displayed on the first display screen and determining the output object to be a second displayed content displayed on the second display screen according to the mirroring display mode, wherein there is a mirroring relationship between the first displayed content and the second displayed content; and
displaying the first displayed content and the second displayed content on the first display screen and the second display screen respectively,
wherein the determining the output object to be the first displayed content displayed on the first display screen or determining the output object to be the second displayed content displayed on the second display screen according to the mirroring display mode, and
wherein there is the mirroring relationship between the first displayed content and the second displayed content, comprises:
adjusting the resolution of the output object according to the screen resolution of the first display screen to obtain the first displayed content; and
processing the first displayed content in a mirroring manner to obtain the second displayed content, wherein the second displayed content is displayed on the second display screen.

2. The method according to claim 1, wherein determining the output object to be the first displayed content displayed on the first display screen or determining the output object to be the second displayed content displayed on the second display screen according to the mirroring display mode, wherein there is the mirroring relationship between the first displayed content and the second displayed content further comprises:
filling the first displayed content and the second displayed content into the display buffer Framebuffer; and
refreshing the content in the display buffer Framebuffer to the display drivers of the first display screen and the second display screen.

3. A non-transitory computer readable storage medium, storing computer executable instructions which are used to execute the method according to claim 1.

4. A terminal with a dual-screen switching display mode comprising:
a processor and a storage, wherein the storage stores a processor-executable program executed by the processor, and the program comprises:
an obtaining module configured to obtain a display mode of the terminal selected by a user, wherein the terminal comprises a first display screen and a second display screen;
a processing module configured to determine a display way of an output object on the first display screen and the second display screen according to the display mode selected by the user obtained by the obtaining module; and
a control module configured to display the output object on at least one of the first display screen and the second display screen according to the display way determined by the processing module,
wherein the control module comprises:

a first control unit configured to, in the instance where the display way determined by the processing module is a mirroring display mode:
determine the output object to be a first displayed content displayed on the first display screen and a second displayed content displayed on the second display screen according to the mirroring display mode, wherein there is a mirroring relationship between the first displayed content and the second displayed content; and
a second control unit configured to display the first displayed content on the first display screen and display the second displayed content on the second display screen, and
wherein the first control unit comprises:
an output subunit configured to adjust the resolution of the output object according to the screen resolution of the first display screen to obtain the first displayed content; and
a transformation subunit configured to process the first displayed content in a mirroring manner to obtain the second displayed content, wherein the second displayed content is displayed on the second display screen.

5. The terminal according to claim 4, wherein the first control unit further comprises:
a filling subunit configured to fill the first displayed content and the second displayed content into the display buffer Framebuffer; and
a buffer subunit configured to refresh the contents in the display buffer Framebuffer to the display drivers of the first display screen and the second display screen.

6. An electronic device, comprising:
at least one processor; and
a storage communicably connected with the at least one processor and configured for storing computer-executable instructions executable by the at least one processor,
wherein the computer-executable instructions when executed by the at least one processor cause the at least one processor to perform:
obtaining a display mode of the terminal selected by a user, wherein the terminal comprises a first display screen and a second display screen;
determining a display way of an output object on the first display screen and the second display screen according to the display mode selected by the user; and
displaying the output object on at least one of the first display screen and the second display screen according to the determined display way,
wherein the terminal is a mobile terminal, and the displaying the output object on at least one of the first display screen and the second display screen according to the determined display way comprises:
in the instance where the determined display way is a mirroring display mode:
determining the output object to be a first displayed content displayed on the first display screen and determining the output object to be a second displayed content displayed on the second display screen according to the mirroring display mode, wherein there is a mirroring relationship between the first displayed content and the second displayed content; and displaying the first displayed content and the second displayed content on the first display screen and the second display screen respectively, wherein the determining the output object to be the first displayed content displayed on the first display screen or determining the output object to be the second displayed content displayed on the second display screen according to the mirroring display mode, and wherein there is the mirroring relationship between the first displayed content and the second displayed content comprises:

adjusting the resolution of the output object according to the screen resolution of the first display screen to obtain the first displayed content; and processing the first displayed content in a mirroring manner to obtain the second displayed content, wherein the second displayed content is displayed on the second display screen.

\* \* \* \* \*